(12) United States Patent
Rácz et al.

(10) Patent No.: US 8,908,524 B2
(45) Date of Patent: Dec. 9, 2014

(54) METHOD OF CONGESTION DETECTION IN A CELLULAR RADIO SYSTEM

(75) Inventors: Sándor Rácz, Cegléd (HU); Lars Blomstergren, Kullavik (SE); Peter Lundh, Skärholmen (SE); Szilveszter Nádas, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 227 days.

(21) Appl. No.: 13/634,376

(22) PCT Filed: Mar. 30, 2010

(86) PCT No.: PCT/SE2010/050347
§ 371 (c)(1),
(2), (4) Date: Sep. 12, 2012

(87) PCT Pub. No.: WO2011/122999
PCT Pub. Date: Oct. 6, 2011

(65) Prior Publication Data
US 2013/0058211 A1    Mar. 7, 2013

(51) Int. Cl.
*H04W 24/00* (2009.01)
*H04L 12/801* (2013.01)
*H04L 12/815* (2013.01)
*H04L 12/927* (2013.01)

(52) U.S. Cl.
CPC ........... *H04L 47/11* (2013.01); *H04L 47/10* (2013.01); *H04L 47/14* (2013.01); *H04L 47/22* (2013.01); *H04L 47/29* (2013.01); *H04L 47/34* (2013.01); *H04L 47/808* (2013.01)
USPC ............................. 370/235; 370/252; 709/235

(58) Field of Classification Search
None
See application file for complete search history.

(56) References Cited

U.S. PATENT DOCUMENTS 6,188,674 B1 *   2/2001   Chen et al. .................... 370/252
6,934,268 B1 *   8/2005   Hedlund et al. .............. 370/311

(Continued)

FOREIGN PATENT DOCUMENTS

CN     102594434 A *   7/2012
WO     2006075951 A1    7/2006

(Continued)

OTHER PUBLICATIONS

Gevros, P. et al.; "Distributed Resource management with Heterogeneous Linear Controls", Computer Networks, Elsevier Science Publishers B.V., Amsterdam, NL; Aug. 21, 2004; vol. 45, No. 6; pp. 835-858. ISSN: 1389-1286, DOI: 10.1016/J.Comnet.2004.05.001.

(Continued)

*Primary Examiner* — Anh-Vu Ly
*Assistant Examiner* — Hashim Bhatti
(74) *Attorney, Agent, or Firm* — Coats & Bennett, PLLC

(57) ABSTRACT

A method for detecting congestion in a transport network is provided. The congestion detection utilizes flow control including relative bitrate. The method comprises counting the number of detected frame loss events for a flow. The method further comprises determining if the number of detected frame losses is greater than or equal to a corresponding threshold, wherein the threshold used is an individual threshold for the flow set taking into account relative bitrate weights of the flow, and detecting transport network congestion for the flow when the number of detected frame losses is greater than or equal to the corresponding threshold.

10 Claims, 3 Drawing Sheets

(56) References Cited

U.S. PATENT DOCUMENTS

| | | | |
|---|---|---|---|
| 7,099,273 B2* | 8/2006 | Ha et al. | 370/229 |
| 7,668,103 B1* | 2/2010 | Pannell et al. | 370/237 |
| 8,537,731 B2* | 9/2013 | Immendorf et al. | 370/310 |
| 2007/0275760 A1* | 11/2007 | Lundh et al. | 455/560 |
| 2009/0147680 A1* | 6/2009 | Liu | 370/232 |
| 2009/0221292 A1* | 9/2009 | Lundh et al. | 455/445 |
| 2010/0203893 A1* | 8/2010 | Lundh et al. | 455/445 |

FOREIGN PATENT DOCUMENTS

| | | | |
|---|---|---|---|
| WO | WO 2006075951 A1 * | 7/2006 | |
| WO | 2006121399 A2 | 11/2006 | |
| WO | 2010107348 A1 | 9/2010 | |

OTHER PUBLICATIONS

Nádas, S. et al., "Providing congestion control in the Iub Transport Network for HSDPA", IEEE Global Telecommunications Conference, Nov. 26, 2007, pp. 5293-5297.

Nádas, S. et al., "HSUPA Transport Network Congestion Control", 2008 IEEE Globecom Workshops, Nov. 30-Dec. 4, 2008, pp. 1-6, New Orleans, LA.

* cited by examiner

METHOD OF CONGESTION DETECTION IN A CELLULAR RADIO SYSTEM

TECHNICAL FIELD

The present invention relates to a method and a device for detecting congestion in a cellular radio system.

BACKGROUND

In a Universal Mobile Telecommunications System (UMTS) Terrestrial Radio Access Network (UTRAN), some potential bottlenecks exist. Two potential bottlenecks are the air interface and the transport network (transport link) connecting a radio network controller (RNC) with respective radio base stations, Node B. The transport link between the RNC and Node B is a potential bottleneck when its capacity is smaller than the available maximal air interface (Uu) capacity. For example, a typical scenario is that the Node B is connected to the RNC through an E1 link of capacity about 2 Mbps and in this case the available Uu capacity for High Speed Downlink Packet Access (HSDPA) can be significantly larger than 2 Mbps. As a result one single user equipment (UE) with good radio conditions can overload the transport network (TN).

Fair sharing of Uu resources is the task of the Uu scheduler, but the Uu scheduler is not enabled to manage the TN bottleneck (i.e. transport link bottleneck). To deal with the TN bottleneck a flow-control (FC) mechanism has been introduced. In FIG. 1 a protocol stack of a UTRAN system is illustrated. FIG. 1 shows the location of the FC in the protocol stack. Thus, the flow control exist in the shaping of the Media Access Control MAC-d (Media Access Control) block in the depicted serving radio network controller (SRNC) and in the congestion determination and bitrate calculation of the Iub framing block of the radio base station NodeB. The goal of this FC is to efficiently use the TN in a fair manner.

Lack of a FC causes serious performance degradation when the TN is the bottleneck. In this case the TN buffer is typically full, causing high TN delay and loss ratio. This causes exhaustive Radio Link Control (RLC) retransmissions which results much lower throughput. In addition to this, RLC reset and a consequent Transmission Control Protocol (TCP) timeout can also occur.

The transport network bottleneck, i.e. between RNC and Radio Base Station (RBS) is handled by a TN flow control, which typically comprises:

- Rate based flow-control with Additive Increased Multiplicative decrease (AIMD) operation.
- Each flow has its own flow-control entity, e.g. separate independent congestion detection
- Congestion is detected in the RBS based on the lost frames, i.e. gap in frame sequence numbers (FSN)
- Congestion detection has a 100 ms aggregation
- at least 1 lost frame is detected during the 100 ms interval by a flow then TN is considered congested during that period by that flow,
- no frame loss during the 100 ms interval detected by a flow then TN is considered by that flow as non-congested.
- Each flow has its own 100 ms tick timer (not synchronized). The 100 ms TN congestion status evaluation periods are not synchronized.
- When a flow detects TN congestion, then the shaping rate in the RNC (maximal bitrate of the flow) is reduced to resolve congestion.
- Relative bitrate (RBR) feature is an extension to the flow-control. Basically this allows service differentiation into different flows with different performance. In one typical configuration the relative bitrate can be organized as: Gold, Silver, Bronze flows, where each of these flows is associated with different characteristics. Typically a set up can be as follows:
  - A Gold flow gets e.g. 2 times higher bandwidth share than a Silver flow
  - Additive Increase part of the flow control is modified to achieve the required bandwidth shares. Practically, a Gold flow has higher increase rate than a Silver flow and so on.
  - Weights are introduced for Gold, Silver and Bronze flows to describe a discrimination between the flows, e.g. 2, 1 and 0.5 for Gold, Silver and Bronze.

In more detail the FC operates per-flow basis, where each HSDPA flow has its own (i) congestion detection, (ii) bitrate calculation and (iii) shaper part. The main tasks of these three parts are the following.

Congestion Detection Part in the Node B

Based on the arrived packets from the RNC, the congestion level of the TN is determined. If a TN congestion is determined this equals a congestion detection and the bitrate calculation part is informed accordingly.

Further a gap in sequence numbers of arriving packets is interpreted as "hard" congestion, because with a very high probability this event is due to packet loss in the TN caused by serious congestion. In addition to this, the variation of the one-way packet delay between RNC and Node B (a given fraction of packets have time-stamp) is measured. If this delay starts to increase, probably due to queue build up in the TN, this is interpreted it as "soft" congestion, but if this delay build up is getting too large (above a threshold e.g. larger than 60 ms) it can be interpreted as "hard" congestion too. The bitrate calculation part can be set to react on hard and soft congestions in differently.

Bitrate Calculation Part in the Node B

This part of the FC calculates the current maximum bitrate of the flow. This maximum bitrate is allowed by the TN for that flow. The applied algorithm conforms with the Additive Increase Multiplicative Decrease (AIMD) property that guarantees convergence to fairness; all flows converge to an equal share of resources in steady state, where no flows join or leave.

The FC maintains an internal variable for the maximum bitrate of the flow. This bitrate is increased linearly (or at least additively) if there is no TN congestion (no reported congestion from congestion detection part). If congestion is reported, the bitrate is reduced. The reduction can typically be 50% in case of hard congestion and 10% in case of soft congestion. When a new flow arrives, a new FC entity is created. A slow-start mechanism can be used to find out the proper starting bitrate of the new flow. After the first congestion the FC behaves according to the above described AIMD manner.

If the calculated bitrate of the flow changes (significantly), then the shaper will be informed about the new bitrate through a control frame called as Capacity Allocation (CA). To avoid too high processing load, this part of the FC is executed periodically with, e.g. a 100-ms period.

Flow Shaper in the RNC

The task of the shaper is to shape the flow according to the signaled maximum flow bitrate. This bitrate is coming from the latest received CA control frame.

The fairness of TN flow-control using the three parts as described above mainly depends on the fairness of TN congestion detection. If the congestion detection is unfair the bandwidth share of flows will be also unfair.

All flows have to detect the TN congestion. When only some flows detect congestion and are involved in resolving the congestion, the fairness will be poor. (Other flows do not detect congestion and in this way they do not decrease their bitrates.)

The number of lost frames (per flow) is approximately proportional with the bitrate of the flow. Flow with higher bitrate has higher amount of packets during a period and in this way has a higher chance for packet loss.

There is a constant demand to provide radio system that is able to give a fair TN flow-control. Hence, there exist a need for a method and a system that is able to provide a flow control that is fair.

SUMMARY

It is an object of the present invention to overcome or at least reduce some of the problems described above.

The inventors have realized that without an RBR feature it is typically not a problem that he number of lost frames (per flow) is approximately proportional with the bitrate of the flow, because all flows have similar bitrate and this way similar number of lost frames. With high TN loss rate it is also not a problem, because there is many frame loss during a 100 ms detection period and it is only need for one lost frame to detect TN congestion. As a result the number of lost frames irrelevant. However, using the RBR feature and with non-extremely high TN loss rate, which is the typical case, the congestion detection can be unfair.

The unfairness of a flow control method of a cellular radio system using HSDPA, where the flow control controls the flow of a number of HSDPA flows can be better understood by considering the following example.

Assume that the TN frame loss rate is 1% (and random). Assume two ongoing flows with different bitrate, e.g. the Flow-2 has 4 time higher rate than Flow-1.

Flow-1: 20 frames per 100 ms
Flow-2: 80 frames per 100 ms

Assuming the above mention 1% frame loss rate, using basic calculation result in the following probabilities for the event "at least one lost frame during 100 ms"

18% for Flow-1 (i.e. 1-0.99^20)
55% for Flow-2 (i.e. 1-0.99^80)

The conclusion is that higher bitrate results in higher chance of detected congestion.

In addition to this effect, the inventors have realized that:
the bursty packet arrivals probably makes thing worse. Larger bitrate results in larger burst and in this ways more lost frames,
smaller loss rate makes congestion detection more sensitive,
for Internet Protocol (IP) TN there is no destroyed frame as in Asynchronous Transmission Mode (ATM) TN. The destroyed frames result in higher frame loss (including destroyed frames that are dropped in the Node-B) in general this is not a good thing, but considering the congestion detection fairness this is improves the fairness.

Thus, the inventors set out to solve these discovered problems. It is therefore an object of the present invention to overcome or at least reduce some of the problems described above.

This object and others are obtained by the method and system as set out in the appended claims. Thus, by taking into account the RBR weights during TN congestion detection, the unfairness of congestion detection can be reduced.

In accordance with one embodiment a method for detecting congestion in a transport network is provided. The congestion detection utilizes flow control including relative bitrate. The method comprises counting the number of detected frame loss events for a flow. The method further comprises determining if the number of detected frame losses is greater than or equal to a corresponding threshold, wherein the threshold used is an individual threshold for the flow set taking into account relative bitrate weights of the flow, and detecting transport network congestion for the flow when the number of detected frame losses is greater than or equal to the corresponding threshold.

In accordance with one embodiment, the counted number of detected frame loss events for a flow is reset upon detecting a transport network congestion.

In accordance with one embodiment the detection of a transport network congestion is performed in a radio network controller for an enhanced uplink flow.

In accordance with one embodiment the detection of a transport network congestion is performed in a radio base station for an high speed downlink packet access flow.

In accordance with one embodiment a separate loss event threshold is applied for each service class (e.g. for Gold, Silver and Bronze). The threshold can be proportional to the RBR weight of the flow.

The methods and functions in accordance with the above can be provided through the use of a device comprising dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

Using the methods and devices as described herein makes it is possible to make higher bitrate flows less sensitive for a single frame loss during TN congestion status evaluation and in this way makes congestion detection fairer also in case of RBR support.

BRIEF DESCRIPTION OF THE DRAWINGS

The present invention will now be described in more detail by way of non-limiting examples and with reference to the accompanying drawings, in which.

DETAILED DESCRIPTION

In accordance with one embodiment, denote the TG, TS and TB the threshold for Gold, Silver and Bronze flows. Set these variables e.g.:

$TG$=Floor[RBRweightG/weightNominalCommon]

$TS$=Floor[RBRweightS/weightNominalCommon]

$TB$=Floor[RBRweightB/weightNominalCommon]

where weightNominalCommon is e.g. equal to the RBR-weightB.

Figure 1:
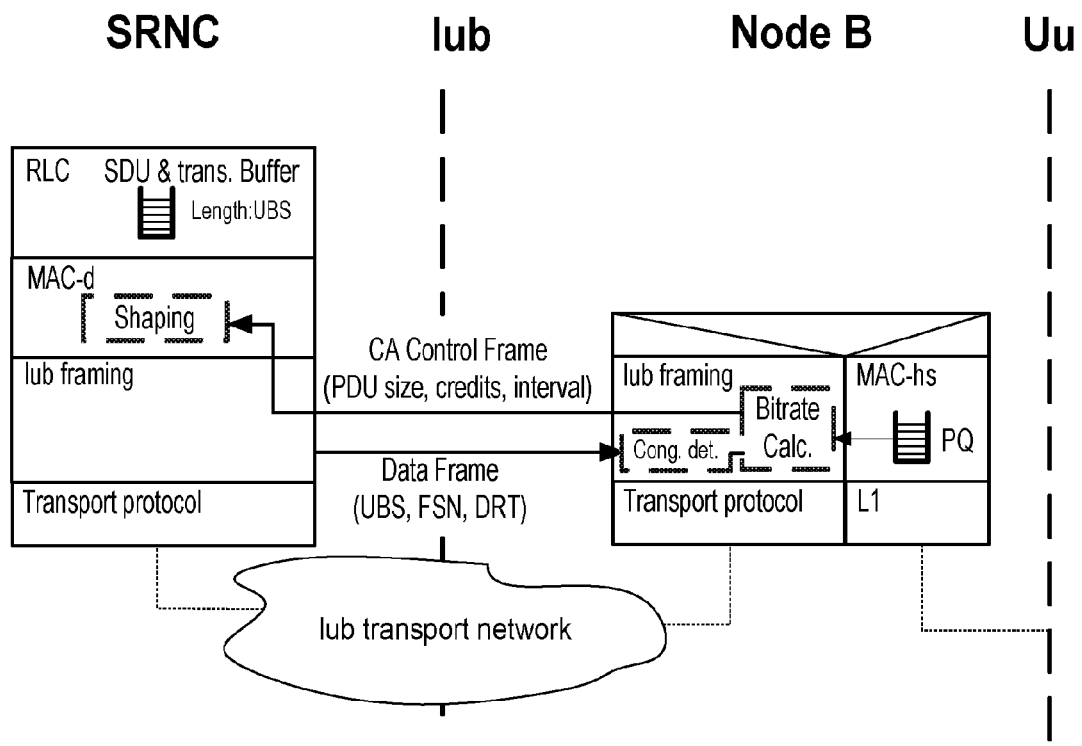
FIG. 1 is a view illustrating the protocol stack of a UTRAN system.
Figure 2:
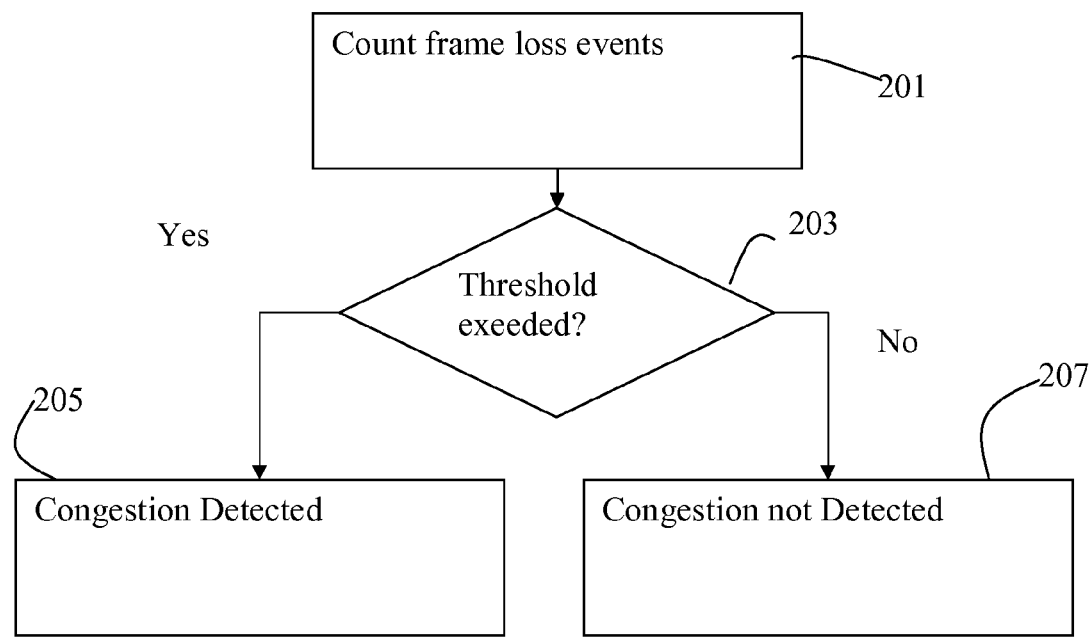
FIG. 2 is a flow chart illustrating some step performed when detecting congestion in a UTRAN system.

It should first be noted that the flow-control is a per-flow flow control so each flow has its own congestion detection functionality. In accordance with one embodiment a congestion detection mechanism for a UTRAN system can be implemented as illustrated in the flow chart of FIG. 2.

First, in a step 201, the number of detected frame loss events is counted for a particular flow. Next, in a step 203, it is determined if the number of detected frame losses is greater than or equal to a corresponding threshold thereby evaluating if there is a congestion. The threshold used is an individual threshold for the flow set taking into account the RBR weights of the flow. If the threshold in step 203 is exceeded transport network congestion is detected for this flow and the counter is reset, step 205. If the threshold in step 203 is not exceeded no transport network congestion is detected for this flow, step 207.

Figure 3:
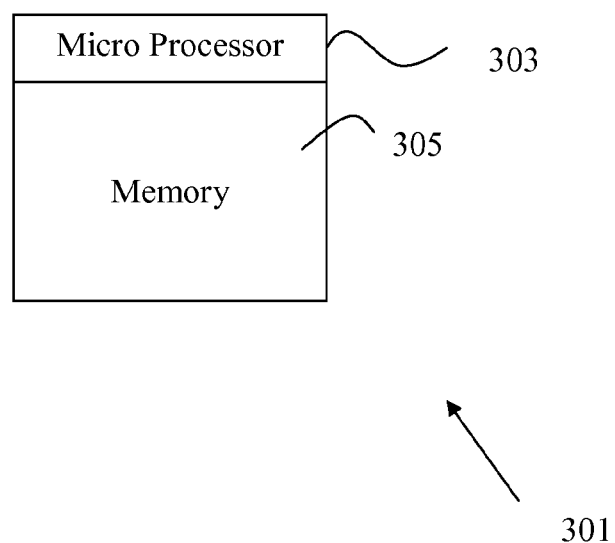
FIG. 3 is a view illustrating a device for detecting congestion in a UTRAN system.

FIG. 3 is a view of a device 301 for performing transport network congestion. The device comprises a micro processor 303 operating on a set of computer program instructions stored on a memory 305 of the device. Execution of the computer program instructions causes the device to perform the different steps of the methods described herein. In particular the computer program instructions can cause the device to detect congestion using an individual threshold for a flow, where the threshold is set taking into account the RBR weights of the flow. The device can be implemented in a radio network controller for uplink flows or in a radio base station for downlink flows.

When RBR feature is not used, then all flows will have the same threshold and the method fall back to the original one. The method and device as described above can be used for both the enhanced uplink (EUL) and High Speed Downlink Packet Access (HSDPA) in the congestion control box. In accordance with one embodiment congestion, evaluation can be set to occur every 100 millisecond (ms) for HSDPA. In accordance with one embodiment, congestion evaluation can be set to occur upon receiving each data frame for EUL.

Using the method and device as described herein will provide fair congestion detection in case of RBR therefore improves fairness when using RBR.

The invention claimed is:

1. A method for detecting transport network congestion in a transport network utilizing flow control including relative bitrate, the method comprising:
   counting a number of detected frame loss events for a flow;
   determining if the number of detected frame losses is greater than or equal to a corresponding threshold, wherein the threshold is an individual threshold for the flow that is set based on relative bitrate weights of the flow;
   detecting transport network congestion for the flow when the number of detected frame losses is greater than or equal to the corresponding threshold;
   resetting the number of detected frame loss events for a flow in response to detecting a transport network congestion.

2. The method of claim 1, wherein the detecting transport network congestion is performed in a radio network controller for an enhanced uplink flow.

3. The method of claim 2, wherein the detecting transport network congestion occurs upon receiving each data frame.

4. The method of claim 1, wherein the detecting transport network congestion is performed in a radio base station for a high speed downlink packet access flow.

5. The method of claim 4, wherein the detecting transport network congestion occurs every 100 milliseconds.

6. A device for detecting transport network congestion in a transport network utilizing flow control including relative bitrate, the device comprising a processor configured to:
   count a number of detected frame loss events for a flow;
   determine if the number of detected frame losses is greater than or equal to a corresponding threshold, wherein the threshold used is an individual threshold for the flow that is set based on relative bitrate weights of the flow;
   detect transport network congestion for the flow when the number of detected frame losses is greater than or equal to the corresponding threshold;
   reset the number of detected frame loss events for a flow in response to detecting a transport network congestion.

7. The device of claim 6:
   wherein the device is a portion of a radio network controller;
   wherein the processor is further configured to perform the detection of transport network congestion for an enhanced uplink flow.

8. The device of claim 7, wherein the processor is configured to perform the detection of transport network congestion after receiving each data frame.

9. The device of claim 6:
   wherein the device is a portion of a radio base station;
   wherein the processor is further configured to perform the detection of transport network congestion for a high speed downlink packet access flow.

10. The device of claim 9, wherein the processor is configured to perform the detection of transport network congestion every 100 milliseconds.

* * * * *